United States Patent [19]

Brindoepke et al.

[11] Patent Number: 5,362,773
[45] Date of Patent: Nov. 8, 1994

[54] AQUEOUS RADIATION-CURABLE BINDER DISPERSIONS

[75] Inventors: Gerhard Brindoepke, Sulzbach; Inge Kurth, Wiesbaden, both of Germany

[73] Assignee: Hoechst Aktiengesellschaaft AG, Germany

[21] Appl. No.: 112,093

[22] Filed: Aug. 26, 1993

[30] Foreign Application Priority Data

Aug. 28, 1992 [DE] Germany ............... 4228713

[51] Int. Cl.$^5$ .............................. C08L 63/02
[52] U.S. Cl. ..................... 523/415; 525/123
[58] Field of Search ............ 523/415; 525/123

[56] References Cited

U.S. PATENT DOCUMENTS 4,153,778  5/1979  Park et al. ............... 528/75
4,451,636  5/1984  Taso et al. .............. 525/920

Primary Examiner—Melvyn I. Marquis
Assistant Examiner—D. Aylward
Attorney, Agent, or Firm—Bierman and Muserlian

[57] ABSTRACT

Aqueous radiation-curable binder dispersion essentially comprising
A) a radiation-curable binder containing (meth)acrylate groups and
B) a radiation-curable emulsifier obtained by reaction of hydroxyalkyl (meth)acrylates, polyglycols, polyhydroxycarboxylic acids and polyisocyanates.

4 Claims, No Drawings

AQUEOUS RADIATION-CURABLE BINDER DISPERSIONS

The invention relates to aqueous, radiation-curable binder dispersions which are free from solvents. The dispersions comprise a radiation-curable binder and a radiation-curable emulsifier.

Polyurethanes containing (meth)acryloyl groups (so-called urethane (meth)acrylates or polyepoxides) have been known for a long time and are particularly suitable as binders for, for example, paints (cf., for example, DE-A 27 37 406). The relatively high viscosity of these products virtually always requires the co-use of organic solvents.

Water-dilutable urethane (meth)acrylates are also known (cf., for example, DE-A 29 36 039). The hydrophilicity of these known systems is based on the presence of ionic centers, in particular sulfonate groups, which contain, as counterions, alkali metal cations or ammonium ions (from tertiary amines), at least one of which remain in the coatings finally obtained from the systems and considerably impair the resistance of the coatings to water.

Another possibility of obtaining water-dilutable products comprises the use of external emulsifiers. Thus, for example, according to U.S. Pat. No. 4,070,323, polyurethanes carrying acryloyl groups are dispersed in water with the aid of anionic or cationic oil-in-water emulsifiers (for example sodium lauryl sulfate). These emulsifiers are not incorporated into the paint film during free radical crosslinking. The degree of waterproofing of the paint films which can be achieved is subsequently reduced not insignificantly.

DE 39 00 257 describes the build-up of a hydrophilic, radiation-curable urethane acrylate, which can be used as an emulsifier for hydrophobic urethane acrylates, by reaction of a polyethylene glycol with a polyisocyanate and a hydroxyalkyl (meth)acrylate. The emulsifying properties of these products are limited because of the inadequate separation of the hydrophobic emulsifier segment from the hydrophilic polyethylene glycol segment, and the stability of the dispersions prepared therefrom is restricted.

The invention was therefore based on the object of providing radiation-curable dispersions of improved stability. This object is achieved by providing such hydrophilic, radiation-curable polyurethane acrylates which, in addition to the polyethylene glycol, also contain a polyhydroxycarboxylic acid as a hydrophilic segment.

The invention thus relates to aqueous radiation-curable binder dispersions comprising essentially A) a radiation-curable binder containing (meth)acrylate groups and
B) a radiation-curable emulsifier obtained by reaction of hydroxyalkyl (meth)acrylates, polyglycols, polyhydroxycarboxylic acids and polyisocyanates.

Possible components A) are all the known binders which carry (meth)acryloyl groups and are therefore radiation-curable. Examples of such polymeric binders are polyacrylates, polyepoxyacrylates, polyurethane acrylates, polyester acrylates, polyether acrylates, melamine acrylates or mixtures thereof. Polymers of this type are described in detail in "UV & EB Curing Formulations for Printing Inks, Coatings & Paints", edited by R. Holman & P. Oldring, London 1988, ISBN 0 947798 02 1.

The radiation-curable emulsifier B) is a polyurethane (meth)acrylate with a content of (meth)acryloyl groups. This emulsifier is prepared by reaction of hydroxyalkyl (meth)acrylate, polyglycol, polyhydroxycarboxylic acid and a polyisocyanate.

The polyglycols are linear polyether glycols having a molecular weight, determined as the number-average, of 400 to 2000, preferably 600 to 15000, the alkylene oxide units of which are ethylene oxide units to the extent of at least 80%, preferably to the extent of 100%. The term "polyethylene glycols" is thus intended to include not only true polyethylene glycols, the alkylene oxide units of which are exclusively ethylene oxide units, but also polyalkylene glycols, the alkylene oxide units of which are predominantly, i.e. to the extent of at least 80%, ethylene oxide units. Such "mixed" polyalkylene glycols are formed, for example, by using mixtures of various alkylene oxides, for example ethylene oxide and propylene oxide in a molar ratio of $\geq 4:1$, during preparation of the polyether glycols by alkoxylation of suitable divalent starter molecules, such as, for example, water, ethylene glycol or propylene glycol. However, pure polyethylene glycols are preferred.

The hydroxyalkyl (meth)acrylates are mono- or polyhydric alcohols containing (meth)acryloyl groups or any desired mixtures of such alcohols. These are understood as meaning as a rule esters of acrylic acid or of methacrylic acid with polyhydric alcohols, the esters containing one free hydroxyl group per molecule. The esters have a molecular weight, determined as the number-average, of 116 to 1000, preferably 116 to 750. Examples of such ethylenically unsaturated partial esters are hydroxyethyl (meth)acrylate, 2- and 3-hydroxypropyl (meth)acrylate, 2-, 3- and 4-hydroxybutyl (meth)acrylate and reaction products of (oxyalkylated) trimethylolpropane with (meth)acrylic acid, such as, for example, the reaction product of 2 mol of acrylic acid and 1 mol of oxyethylated trimethylolpropane (OH number 550, degree of oxyethylation about 4), as well as trimethylolpropane diacrylate and pentaerythritol triacrylate.

Products which are furthermore possible here are reaction products of (meth)acrylic acid with terminal or central epoxides, such as, for example, hexene oxide, dodecene oxide or epoxidized linseed or soya oil, as well as reaction products of these acids with glycidyl esters, preferably of saturated aliphatic monocarboxylic acids which have 8–14 carbon atoms and are branched in the α-position, such as, for example, ®Cardura E 10 (glycidyl ester of "Versatic acid"). Reaction products of acrylic or methacrylic acid with polyepoxides, such as, for example, the diglycidyl ether of bisphenol A or F, or of hexane-, butane- or neopentylglycol or of cyclohexanedimethanol can also be co-used in certain amounts.

These compounds carry two hydroxyl and acrylic acid groups and, if desired, can thus effect an additional build-up of molecular weight. Particular properties are to be obtained by using a reaction product of hydroxyalkyl (meth)acrylate with ε-caprolactone.

Examples of polyhydroxycarboxylic acids are citric acid, malic acid or a 2,2-bis(hydroxymethyl)alkanecarboxylic acid having a total of at least 5 carbon atoms, preferably 2,2-bis(hydroxymethyl)propionic acid.

Suitable polyisocyanates are any desired organic polyisocyanates which are known per se from polyurethane chemistry and have aliphatically, cycloaliphatically and/or aromatically bonded isocyanate groups and, preferably, a molecular weight of 168 to 1000, preferably 168 to 300. Examples of suitable polyisocyanates are 1-isocyanato-3,3,5-trimethyl-5-isocyanatomethyl-cyclohexane (IPDI), 4,4′-diisocyanato-dicyclohexylmethane, 4,4′-diisocyanatodiphenylmethane, industrial mixtures thereof with 2,4-diisocyanatodiphenylmethane and if appropriate the higher homologs of these diisocyanates, 2,4-diisocyanatotoluene and industrial mixtures thereof with 2,6-diisocyanatotoluene, hexamethylene diisocyanate, trimethylhexamethylene diisocyanate or tetramethylene-xylylene diisocyanate (TMXDI).

Biuret-, isocyanurate- or urethane-modified polyisocyanates based on these simple polyisocyanates are also suitable. These derivatives in general have a molecular weight of up to 1000. The preparation of such derivatives is described, for example, in U.S. Pat. Nos. 3,124,604, 3,183,112, 3,919,218 or 4,324,879.

The preparation of the polyurethanes according to the invention which are to be used as emulsifiers can be carried out by reaction of the starting components mentioned in bulk or in solvents which are inert towards isocyanate groups, such as, for example, acetone, methyl ethyl ketone, ethyl acetate, butyl acetate, toluene, low molecular weight esters of (meth)acrylic acid or mixtures of such solvents, reaction temperatures of 20° to 100° C., in particular 20° to 80° C., preferably being maintained.

The reaction can also be carried out in the presence of a radiation-curable inert reactive diluent, such as, for example, hexanediol acrylate, trimethylolpropane triacrylate or the triacrylate of ethoxylated trimethylolpropane.

In practice, for example, a procedure can be followed in which the polyisocyanate is initially introduced into the reaction vessel and is reacted with the hydroxyalkyl (meth)acrylate under mild conditions, for example within the abovementioned temperature ranges, after which the reaction with the polyethylene glycol and the polyhydroxycarboxylic acid follows, likewise within the temperature ranges mentioned, until the NCO content has fallen to less than 0.1% by weight. In principle, the reverse sequence of reaction of the components is also possible. In this case, NCO-terminated polyurethane is first built up from polyethylene glycol and hydroxycarboxylic acid, and is blocked with the hydroxyalkyl acrylate in the second step. The nature and proportions of the starting components here are in principle chosen within the ranges mentioned, so that an NCO/OH equivalent ratio of 0.9 to 1.1, based on all the starting compounds, is ensured.

The proportions of the starting compounds for the preparation of emulsifier B) are preferably 1 to 30% by weight of hydroxyalkyl (meth)acrylate, 50 to 95% by weight of polyglycol, 0.2 to 10% by weight of hydroxycarboxylic acid and 2 to 50% by weight of polyisocyanate.

The urethane formation reactions can be catalyzed in a manner which is known per se, for example with tin octanoate, dibutyltin dilaurate or tertiary amines. The urethane acrylate can also be protected from premature and undesirable polymerization by addition of suitable inhibitors and antioxidants in an amount of in each case 0.001 to 0.3% by weight, based on the total mixture.

The polyurethanes containing hydrophilic (meth)acryloyl groups obtained in this manner have a molecular weight Mw, determined as the weight average, which can be ascertained by the method of gel permeation chromatography, of 1000 to 30000, preferably 1500 to 20000, a content of olefinic double bonds (calculated as $=C=C=$, molecular weight$=24$) of at least 0.1% by weight, preferably 0.2 to 5.0% by weight, and a content of ethylene oxide units —$C_2H_4O$— incorporated via polyethylene glycol of 20 to 90, preferably 30 to 85% by weight.

However, neutralization of the carboxyl groups present is not absolutely essential for the emulsifying action of the products, but can be carried out with the known amines, such as, for example, ammonia, triethylamine or N-methyldiethanolamine.

To protect the resulting emulsifier from undesirable premature polymerization, it is advisable for 0.001–0.5% by weight, based on the total mixture, of polymerization inhibitors already to be added during the preparation.

Suitable auxiliaries of this type are, for example, phenols and phenol derivatives, preferably sterically hindered phenols which contain alkyl substituents having 1–6 carbon atoms in the two o-positions relative to the phenolic hydroxyl group, amines, preferably secondary arylamines and their derivatives, quinones, copper(I) salts of organic acids or addition compounds of copper(I) halides with phosphites.

Compounds which may be mentioned by name are: 4,4′-bis-(2,6-di-tert.-butylphenol), 1,3,5-trimethyl-2,4,6-tris-(3,5-di-tert.-butyl-4-hydroxy-benzyl)-benzene, 4,4′-butylidene-bis-(6-tert.-butyl-m-cresol), diethyl 3,5-di-tert.-butyl-4-hydroxybenzylphosphonate, N,N′-bis-($\beta$-naphthyl)-p-phenylenediamine, N,N′-bis-(1-methylheptyl)-p-phenylenediamine, phenyl-$\beta$-naphthylamine, 4,4′-bis-($\alpha,\alpha$-dimethylbenzyl)-diphenylamine, 1,3,5-tris-(3,5-di-tert.-butyl-4-hydroxy-hydrocinnamoyl)-hexahydro-s-tri-azine, hydroquinone, hydroquinone monomethyl ether, p-benzoquinone, 2,5-di-tert.-butylquinone, toluhydroquinone, p-tert.-butylpyrocatechol, 3-methylpyrocatechol, 4-ethylpyrocatechol, chloranil, naphthoquinone, copper naphthenate, copper octanoate and p-nitrosodimethylaniline.

Other suitable stabilizers are described in "Methoden der organischen Chemie [Methods of Organic Chemistry]" (Houben-Weyl), 4th edition, Volume XIV/1, pages 433–452, 756, Georg Thieme Verlag, Stuttgart, 1961.

To prepare the dispersions according to the invention, components A) and B) are mixed and water is then introduced into this mixture, while stirring. The weight ratio of components A) and B) is 50 to 95, preferably 70 to 95% by weight of component A) and 5 to 50, preferably 5 to 30% by weight of component B).

To form a finely divided emulsion, it is advantageous to add the water in portions at temperatures below 60° C. Stable oil-in-water emulsions can be obtained in this manner.

The aqueous dispersions obtained in this manner are valuable aqueous binders for coating agents. They can be used for the production of coatings on any desired substrates as such or in combination with the auxiliaries and additives known from coatings technology, such as, for example, fillers, pigments, solvents, flow agents and the like.

Suitable substrates are paper, cardboard, leather, wood, plastics, nonwovens, textiles, ceramic materials, mineral materials, glass, metal, synthetic leather and photographic materials such as, for example, paper provided with a photographic layer.

The dispersions according to the invention can have solids contents of 5 to 90% by weight. The solids content is understood as meaning the sum of binder and emulsifier.

These dispersions can be applied in a known manner by spraying, knife-coating, rolling, brushing, dipping or pouring. After the water and any inert solvents co-used have evaporated, the coatings can be crosslinked either by means of high-energy radiation, such as UV light, electron beams or gamma rays, or by curing with metal salts of siccative acids and (hydro)peroxides at temperatures of between 80° and 250° C.

If the dispersions according to the invention are cured by UV light, it is necessary to add photoinitiators. These are as a rule dissolved in the binder and dispersed with this in the aqueous phase, or subsequently added and dispersed.

Suitable photoinitiators are the compounds usually employed, such as are described, for example, in the monograph by J. Kosar, Light-Sensitive Systems, J. Wiley & Sons, New York-London-Sydney, 1965.

Photoinitiators which are furthermore particularly suitable are benzoin ethers, such as benzoin isopropyl ether, benzil ketals, such as, for example, benzil di-methyl ketal, and hydroxyalkylphenols, such as, for example, 2-hydroxy-2-methyl-1-phenylpropan-1-one.

The photoinitiators mentioned, which are employed in amounts of between 0.1 and 10% by weight, preferably 0.1 to 5% by weight, based on the weight of the binder in dispersed form, depending on the intended use of the compositions according to the invention, can be used as an individual substance or, because of frequent advantageous effects, also in combination with one another.

Radiation sources which can be used for carrying out the photopolymerization are artificial emitters, the emission of which is in the range from 2500 to 5000 Å, preferably 3000 to 4000 Å. Mercury vapor, xenon and tungsten lamps, especially high pressure mercury lamps, are advantageous.

Layers of the reaction products according to the invention as a rule can be cured fully to a film in less than one second.

If fillers are co-used, their use is limited to those which do not suppress the polymerization process by their absorption properties. For example, talc, barite, chalk, gypsum, silicic acids, ground asbestos and calcium sulfate can be used as transparent fillers.

If curing is effected by thermal initiators or by high-energy radiation, for example electron beams or γ-radiation, all fillers, pigments and reinforcing materials such as are usually employed can in principle be used.

Preparation of the binder

EXAMPLE B1

870 parts of EUROPOX® RV-C (commercially available diglycidyl ether based on cyclohexanedimethanol from SCHERING AG, epoxide content: 9.1%), 2.5 parts of hydroquinone monomethyl ether and 6 parts of triphenylphosphine are heated to 90° C. while passing air through, and 335 parts of acrylic acid are added in the course of 2 hours. The mixture is subsequently stirred under the same conditions until an acid number of <5 is reached. A pale yellow product having a viscosity of 6100 mPas and a double bond content of 9.1% is obtained.

EXAMPLE B2

3348 parts of BECKOPOX® EP 140 (commercially available diglycidyl ether based on bisphenol A from HOECHST AG, epoxide content: 8.6%), 1.4 parts of hydroquinone monomethyl ether and 16 parts of triethylamine are heated to 90° C. while passing air through, and 1296 parts of acrylic acid are added in the course of 2 hours. The mixture is subsequently stirred under the same conditions until an acid number of <5 is reached. A pale yellow product having a viscosity of 10500 mPas and a double bond content of 9.2% is obtained.

EXAMPLE B3

273 parts of isophorone diisocyanate, 0.8 part of 2,6-di-tert.-butyl-4-methylphenol and 1.3 parts of dibutyltin dilaurate are mixed at room temperature, while passing air through, and a mixture of 166 parts of 2-hydroxybutyl acrylate, 17 parts of hydroxyethyl acrylate, 23 parts of 2-hydroxybutyl acrylate and 160 parts of a trifunctional caprolactone (OH number: 308 mg of KOH/g) is added in the course of 2 hours.

97 parts of Sartomer® 454 (commercially available triacrylate of an ethoxylated trimethylolpropane from Cray-Valley) are then added, and the mixture is subsequently stirred until an isocyanate content of <0.2% is reached. A colorless product having a viscosity of 2400 mPas and a double bond content of 7.0% is obtained.

PREPARATION OF THE EMULSIFIERS

EXAMPLE E1

300 parts of polyethylene glycol (average molecular weight 6000) and 3.4 parts of dimethylolpropionic acid are heated to 100° C., while stirring, and dehydrated by application of a waterpump vacuum. After cooling to 55° C., 0.2 part of dibutyltin dilaurate and 84.4 parts of Sartomer 454 (commercially available triacrylate of an ethoxylated trimethylolpropane from Cray-Valley) are added. 17.4 parts of toluylene diisocyanate are added dropwise in the course of 30 minutes, while passing air through; after a further 15 minutes, 16.7 parts of a reaction product of 12.9 parts of Cardura E10 (commercially available glycidyl ester of Versatic acid from SHELL) and 3.8 parts of acrylic acid are added dropwise. The mixture is then subsequently stirred at the same temperature until an NCO content of <0.1% is reached. After addition of 0.3 part of hydroquinone monomethyl ether, the mixture is then diluted with 927 parts of water.

A cloudy emulsifier solution with a viscosity of 1200 mPas and a pH of 3.8 is obtained.

EXAMPLE E2

17.4 parts of toluylene diisocyanate and 0.2 part of dibutyltin dilaurate are heated to 40° C., and 16.7 parts of a reaction product of 12.9 parts of Cardura® E10 (commercially available glycidyl ester of Versatic acid from SHELL) and 3.8 parts of acrylic acid are added, while passing air through. When the theoretical isocyanate content has been reached, this semi-masked isocyanate thus obtained is added dropwise at 60° C. to a solution of 84.4 parts of Sartomer 454 (commercially available triacrylate of an ethoxylated trimethylolpropane from Cray-Valley) and a mixture comprising 300 parts of polyethylene glycol (average molecular weight 6000) and 3.4 parts of dimethylolpropionic acid, which has been dehydrated in vacuo at 100° C.

The mixture is then subsequently stirred at the same temperature until an NCO content of <0.1% is reached. After addition of 0.3 part of hydroquinone monomethyl ether, the mixture is then diluted with 927 parts of water.

A cloudy emulsifier solution having a viscosity of 1600 mPas and a pH of 3.6 is obtained.

EXAMPLE E3

300 parts of polyethylene glycol (average molecular weight 6000) and 3.4 parts of dimethylolpropionic acid are heated to 100° C., while stirring, and dehydrated by application of a waterpump vacuum. After cooling to 55° C., 0.2 part of dibutyltin dilaurate and 86 parts of Sartomer 454 (commercially available triacrylate of an ethoxylated trimethylolpropane from Cray-Valley) are added. 22.2 parts of isophorone diisocyanate are added dropwise in the course of 30 minutes, while passing air through; after a further 15 minutes, 16.7 parts of a reaction product of 12.9 parts of Cardura E10 (commercially available glycidyl ester of Versatic acid from SHELL) and 3.8 parts of acrylic acid are added dropwise. The mixture is then subsequently stirred at the same temperature until an NCO content of <0.1% is reached. After addition of 0.3 part of hydroquinone monomethyl ether, the mixture is then diluted with 1285 parts of water.

A cloudy emulsifier solution having a viscosity of 150 mPas and a pH of 3.8 is obtained.

EXAMPLE E4

250 parts of polyethylene glycol (average molecular weight 10000) and 1.7 parts of dimethylolpropionic acid are heated to 100° C., while stirring, and dehydrated by application of a waterpump vacuum. After cooling to 55° C., 0.1 part of dibutyltin dilaurate and 67.2 parts of Sartomer 454 (commercially available triacrylate of an ethoxylated trimethylolpropane from Cray-Valley) are added. 8.7 parts of toluylene diisocyanate are added dropwise in the course of 30 minutes, while passing air through; after a further 15 minutes, 8.4 parts of a reaction product of 6.3 parts of Cardura E10 (commercially available glycidyl ester of Versatic acid from SHELL) and 1.9 parts of acrylic acid are added dropwise. The mixture is then subsequently stirred at the same temperature until an NCO content of <0.1% is reached. After addition of 0.1 part of hydroquinone monomethyl ether, the mixture is then diluted with 1009 parts of water.

A cloudy emulsifier solution having a viscosity of 790 mPas and a pH of 3.8 is obtained.

EXAMPLE E5

17.4 parts of toluylene diisocyanate and 0.2 part of dibutyltin dilaurate are heated to 40° C., and 16.7 parts of a reaction product of 12.9 parts of Cardura® E10 (commercially available glycidyl ester of Versatic acid from SHELL) and 3.8 parts of acrylic acid are added in the course of 60 minutes, while passing air through. When the theoretical isocyanate content has been reached, this semi-masked isocyanate thus obtained is added dropwise at 60° C. to a solution comprising 145 parts of acetone and a mixture comprising 300 parts of polyethylene glycol (average molecular weight 6000) and 3.4 parts of dimethylolpropionic acid, which has been dehydrated at 100° C. in vacuo.

The mixture is then subsequently stirred at the same temperature until an NCO content of <0.1% is reached. After addition of 0.3 part of hydroquinone monomethyl ether, the acetone is then distilled out in vacuo and the mixture is diluted with 900 parts of water. A cloudy emulsifier solution having a viscosity of 1100 mPas and a pH of 4.3 is obtained.

PREPARATION OF THE DISPERSIONS

EXAMPLE D1

1610 parts of binder B1 are heated to 40° C., and homogenized, with 560 parts of emulsifier E1, while stirring, 380 parts of water are introduced in the course of 5 minutes, while stirring with a dissolver (U=20 m/sec). After stirring for 15 minutes, the dispersion is cooled to room temperature and diluted with 950 parts of water. A white, milky dispersion having a viscosity of 350 mPas and a pH of 3.9 is obtained.

EXAMPLE D2

276 parts of binder B2 are heated to 40° C., and homogenized, with 96 parts of emulsifier E1, while stirring. 80 parts of water are introduced in the course of 5 minutes, while stirring with a dissolver (U=20 m/sec). After stirring for 15 minutes, the dispersion is cooled to room temperature and diluted with 148 parts of water. A white, milky dispersion having a viscosity of 680 mPas and a pH of 4.3 is obtained.

EXAMPLE D3

276 parts of binder B2 are heated to 40° C., and homogenized, with 96 parts of emulsifier E5, while stirring. 80 parts of water are introduced in the course of 5 minutes, while stirring with a dissolver (U=20 m/sec). After stirring for 15 minutes, the dispersion is cooled to room temperature and diluted with 148 parts of water. A white, milky dispersion having a viscosity of 540 mPas and a pH of 4.5 is obtained.

EXAMPLE D4

184 parts of binder B2 are heated to 40° C., and homogenized, with 64 parts of emulsifier E5, while stirring. 65 parts of water are introduced in the course of 5 minutes, while stirring with a blade-type stirrer (speed of rotation=400 revolutions/minute). After stirring for 2 hours, the dispersion is cooled to room temperature and diluted with 131 parts of water. A white, milky dispersion having a viscosity of 750 mPas and a pH of 3.5 is obtained.

EXAMPLE D5

368 parts of binder B3 are heated to 40° C., and homogenized, with 128 parts of emulsifier E1, while stirring. 140 parts of water are introduced in the course of 5 minutes, while stirring with a blade-type stirrer (speed of rotation=400 revolutions/minute). After stirring for 2 hours, the dispersion is cooled to room temperature and diluted with 164 parts of water. A white, milky dispersion having a viscosity of 300 mPas and a pH of 4.0 is obtained.

We claim:

1. An aqueous radiation-curable binder dispersion consisting essentially of
    A) a radiation-curable binder containing (meth)acrylate groups and
    B) a radiation-curable emulsifier obtained by reaction of hydroxyalkyl (meth)acrylates, polyglycols, polyhydroxycarboxylic acids and polyisocyanates.

2. An aqueous radiation-curable binder dispersion as claimed in claim 1, wherein the emulsifier is obtained by reaction of 1 to 30% by weight of hydroxyalkyl (meth-)acrylate, 50 to 95% by weight of polyglycol, 0.2 to 10% by weight of polyhydroxycarboxylic acid and 2 to 50% by weight of polyisocyanate.

3. An aqueous radiation-curable binder dispersion as claimed in claim 1, wherein component A) is a polyacrylate, polyepoxy acrylate, polyurethane acrylate, polyester acrylate, polyether acrylate or melamine acrylate or a mixture thereof.

4. A radiation-curable coating composition containing a binder dispersion of claim 1.

* * * * *